(12) United States Patent
Chang et al.

(10) Patent No.: US 7,672,283 B1
(45) Date of Patent: Mar. 2, 2010

(54) DETECTING UNAUTHORIZED WIRELESS DEVICES IN A NETWORK

(75) Inventors: Chia-Chi Chang, Taipei (TW); Link Lin, Taipei (TW)

(73) Assignee: Trend Micro Incorporated, Yoyogi, Shibuya-ku (JP)

( * ) Notice: Subject to any disclaimer, the term of this patent is extended or adjusted under 35 U.S.C. 154(b) by 660 days.

(21) Appl. No.: 11/536,604

(22) Filed: Sep. 28, 2006

(51) Int. Cl.
*H04W 4/00* (2009.01)
*H04J 3/16* (2006.01)

(52) U.S. Cl. ...................................... 370/338; 370/346
(58) Field of Classification Search ................. 370/338, 370/346, 241
See application file for complete search history.

(56) References Cited

U.S. PATENT DOCUMENTS

| | | | |
|---|---|---|---|
| 6,766,309 B1* | 7/2004 | Cheng et al. ................... 706/3 |
| 6,954,775 B1* | 10/2005 | Shanklin et al. ............. 718/105 |
| 2003/0117959 A1* | 6/2003 | Taranov ....................... 370/241 |
| 2003/0217289 A1* | 11/2003 | Ammon et al. ............. 713/201 |
| 2004/0215975 A1* | 10/2004 | Dudfield et al. ............. 713/201 |
| 2005/0265321 A1* | 12/2005 | Rappaport et al. .......... 370/352 |
| 2006/0123133 A1* | 6/2006 | Hrastar ....................... 709/238 |
| 2006/0136219 A1* | 6/2006 | Wang .......................... 704/273 |
| 2007/0061266 A1* | 3/2007 | Moore et al. .................. 705/51 |

* cited by examiner

*Primary Examiner*—Dwayne Bost
*Assistant Examiner*—Chhean Thao
(74) *Attorney, Agent, or Firm*—IP Strategy Group, P.C.

(57) ABSTRACT

Computer implemented techniques for detecting the presence and identity of unauthorized wireless devices ("UWD") on a network. The technique is capable of detecting the presence and existence UWDs irrespective whether the UWDs implements encryption in their communication. Furthermore, it is unnecessary for the computer-implemented method to access the management console of a wireless access point for the purpose of determining the identity of the wireless client devices that currently employ the access point to accomplish the wireless communication. The computer-implemented method also does not require any software agent to be installed on the wireless client devices for the purpose of detecting unauthorized wireless communication.

23 Claims, 5 Drawing Sheets

| CONFIDENCE INTERVAL UPPER LIMIT FOR REFERENCE GROUP | AVERAGE | STANDARD DEVIATION | MINIMAL |
|---|---|---|---|
| | 534 | 39 | 349 |

| IP ADDRESS | AVERAGE | STANDARD DEVIATION | MINIMAL |
|---|---|---|---|
| 10.1.116.1 | 1056 | 681 | 392 |
| 10.1.116.2 | 2210 | 111 | 2173 |
| 10.1.116.5 | 287 | 7 | 281 |
| 10.1.116.8 | 363 | 6 | 354 |
| 10.1.116.15 | 255 | 8 | 247 |
| 10.1.116.16 | 291 | 8 | 284 |
| 10.1.116.17 | 292 | 5 | 284 |
| ... | ... | ... | ... |
| ... | ... | ... | ... |
| ... | ... | ... | ... |
| 10.1.116.143 | 890 | 38 | 866 |

FIG. 3

DETECTING UNAUTHORIZED WIRELESS DEVICES IN A NETWORK

BACKGROUND OF THE INVENTION

Computers and their use are pervasive in organizations and enterprises. In a typical organization, there may be dozens, hundreds, or even thousands of client computers interconnected via an internal network (e.g., an intranet) to communicate with one another and with applications servers in the network. Switches (e.g., routers, bridges, hubs, etc.) facilitate the routing of data packets among the client computers, to/from the servers in the Intranet, and to/from the extranet (e.g., the Internet).

Given the amount of data handled by computers nowadays, data security is a big concern of organizations and in particular of the organization's IT staff. One of the biggest security risks to computer data pertains to the use of unauthorized wireless access points (APs). Generally speaking, a wireless access point represents a wireless switch that can be plugged into the network to allow wireless client devices (such as laptop computers and other wireless devices) to send and receive data via the enterprise's network. Via an access point, a wireless laptop computer may, for example, access applications on the enterprise servers, send and receive information with one or more other client devices or servers, and/or may even access the Internet.

Access points can be either authorized or unauthorized. Authorized access points represent access points that met the approval of professional IT staff and tend to be properly installed and safeguarded against security risks. Generally speaking, the skills required to properly safeguard an access point against security risks tend to be fairly high, and thus the proper installation and configuration of an authorized access point typically requires the expertise of well-trained IT staff. A typical user may be able to purchase and install a wireless access point but unless the user is adequately trained in the latest security risk countermeasures, it is unlikely that an average user would have enough technical knowledge to properly safeguard an access point against unauthorized access and other security risks.

The omni-directional broadcast nature of wireless access points also render access points particularly vulnerable to attempts by unauthorized users or hackers to intrude into the enterprise's network. Thus, detecting unauthorized access points and unauthorized wireless client devices in a network is one of the highest priorities of security-conscious IT staff.

Generally speaking, an access point may be managed by a management console, which represents a software construct accessible to the user to manage the access point. For example, the management console of a given access point may be accessible via the browser by pointing at a special IP address and entering the required userID and password when asked. By accessing the management console, the user may set up security parameters, control access privilege of users, and perform other access point management tasks.

However, unless IT staff knows of the existence of an access point and knows the IP address or the means by which the management console can be accessed, and further knows the userID and password, the management console is not useful to IT staff as a tool to ascertain the presence and identity of unauthorized wireless devices and unauthorized wireless access points in a network.

IT staff may attempt to install a software agent on all client devices. The software agent is configured to inform the IT staff whenever the client computer employs the wireless mode for communication within the enterprise perimeter. If the wireless mode is authorized, no alarm is raised. On the other hand, if a client computer employs the wireless mode for communication, and such wireless communication is unauthorized by IT staff for this particular computer, the software agent may enable IT staff to quickly ascertain the identity of the offending client computer, thereby enabling IT staff to quickly address the security risk.

However, the software agent only works if it is installed on the client device. This simple fact renders the software agent approach lacking as a reliable security solution. As an example, some users may access the enterprise's network using personal laptop computers or personal PDAs in which the software agent has not been installed by IT staff. As another example, intruders most likely would employ their own computers, which are inaccessible to IT staff for installing the software agent, for hacking into the network. In these cases, no information would be provided to IT staff even if unauthorized wireless access has occurred.

IT staff may also employ wireless sniffers, which are commercially available monitoring devices, for monitoring wireless packets that are transmitted via the wireless medium within the vicinity of the enterprise. By sniffing wireless packets, the wireless sniffer can ascertain the identity of the origination and destination devices (e.g., by inspecting the origination IP address and the destination IP address in the header of wireless packets). If the number of wireless devices on the network exceeds the number of wireless devices actually authorized, the existence of an unauthorized wireless device is a possibility.

However, over-burdened IT staff nowadays tend to be reluctant to purchase, maintain, and use yet another tool. It is often the case that IT staff in a typical organization is already stretched as they try to keep up with rapidly changing technology and the ever-changing demands of users. This is particularly true for small organizations, which typically have neither the budget nor the manpower to purchase or maintain expensive tools for network management. Accordingly, commercial sniffers and their use have not been widely adopted by IT organizations.

SUMMARY OF INVENTION

The invention relates, in an embodiment, to a computer-implemented method for ascertaining whether a wireless device exists in a network. The method includes sending a plurality of test packets over a monitoring period to a first device, the plurality of test packets being sent in a temporally spaced-apart manner, and receiving responses to the plurality of test packets from the first device. The method also includes ascertaining a first set of RTT (Round Trip Time) values, each of the first set of RTT values corresponding to one of the plurality of test packets. The method further includes computing a first set of statistical values from the first set of RTT values, the first set of statistical values including at least a first standard deviation value for the set of RTT values and one of a first average RTT value and a first minimal RTT value for the first set of RTT values. The method additionally includes designating the first device a potential wireless device if both a first condition and a second condition are found. The first condition is characterized by the at least one of the first average RTT value and the first minimal RTT value exceeds a corresponding one of a reference average RTT value and a reference minimal RTT value, the reference average RTT value representing an average RTT value for known wired devices in the network, the reference minimal RTT value representing a minimal RTT value for the known wired devices in the network. The second condition is characterized by the first standard deviation value exceeding a confidence interval established for a standard deviation value associated with the known wired devices.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows an example table that is generated by an embodiment of the invention to ascertain whether a particular client device is a wireless client device or a wired client device.

DETAILED DESCRIPTION OF EMBODIMENTS

Figure 1:
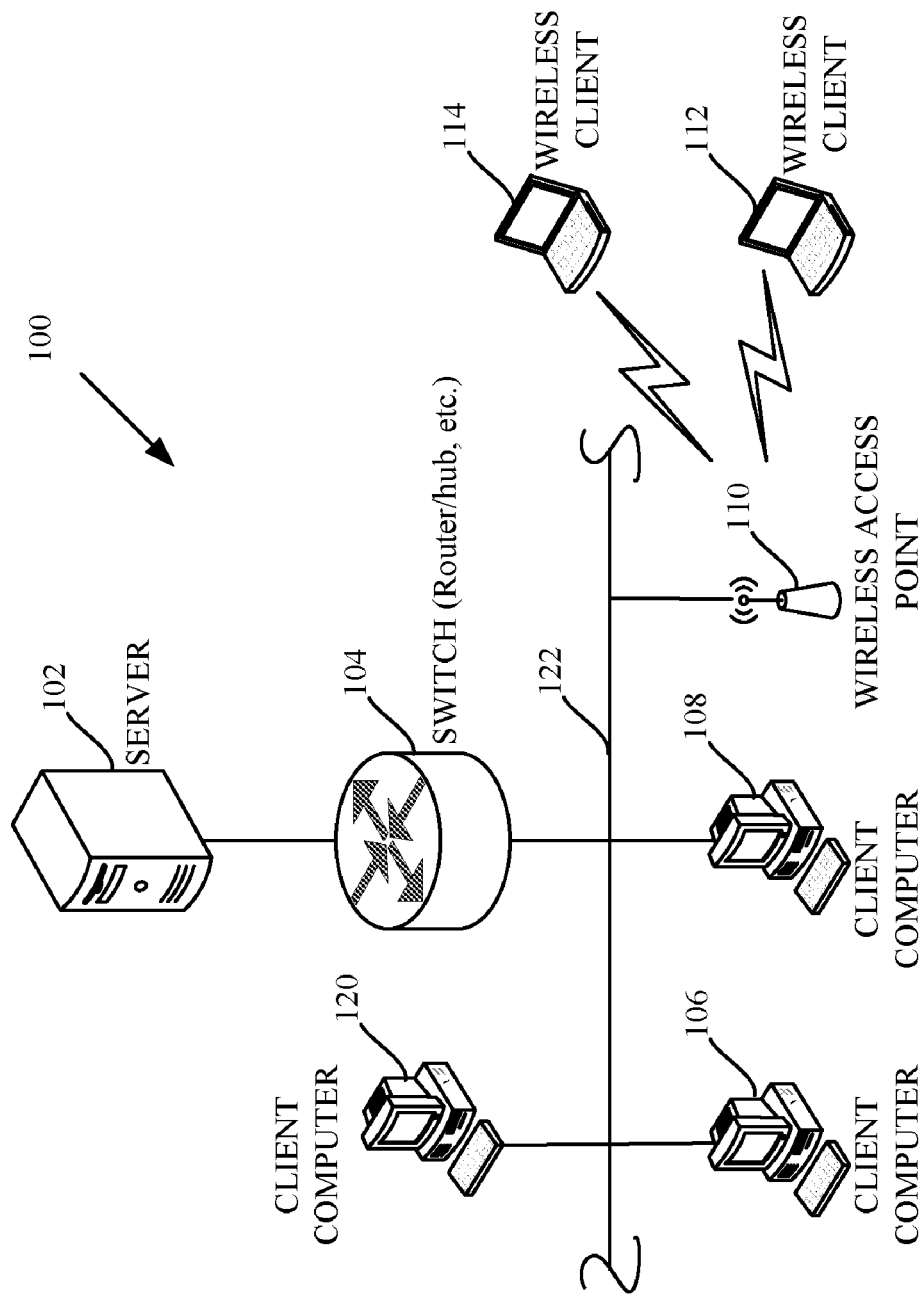
FIG. 1 shows, in accordance with an embodiment of the present invention, an example network environment in which the method is practiced.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided computer implemented techniques for detecting the presence and identity of unauthorized wireless devices ("UWD") on a network. As the term is employed herein, an unauthorized wireless device ("UWD") includes either or both of the unauthorized wireless AP and the unauthorized wireless client device (such as a wireless laptop, a wireless desktop, a wireless internet telephone phone, or any wireless communication device that is not authorized). The inventive method is capable of detecting the presence and existence UWDs irrespective whether the UWDs implement encryption in their communication. Furthermore, it is unnecessary for the computer-implemented method to access the management console of a wireless access point for the purpose of determining the identity of the wireless client devices that currently employ the access point to accomplish the wireless communication. The computer-implemented method also does not require any software agent to be installed on the wireless client devices for the purpose of detecting unauthorized wireless communication.

In an embodiment of the invention, software in network switches tracks the round trip time of test packets sent to client devices (whether wired or wireless) and compute various statistics regarding the RTT (round trip time). It should be noted that the term "switch" as employed herein covers one or more of routers, bridges, hubs, and/or any other device that facilitates the passing of data packets among client computers and between a client computer and one or more servers in the network or the Internet.

Irrespective whether the client device is a wired device or a wireless device, a test packet would take a finite amount of time to traverse from the switch to the destination device. A finite amount of time is also needed for the response to be formulated and transmitted from the client destination device back to the switch. The time that it takes to complete this round trip journey is deemed the Round Trip Time.

Upon receiving the response to a test packet, the switch notes the Round Trip Time for that client device. In each monitoring round, which may last anywhere from seconds, minutes, or hours, the switch may send a plurality of test packets, which may be temporally spaced apart, to obtain multiple RTT samples from a given client device. The data collected regarding the RTT is employed to generate statistics regarding the communication with a specific client device.

By comparing the RTT statistics of a particular client device with RTT statistics of known wired client devices in the network, inferences may be made which would predict with a high degree of accuracy whether a particular client device is communicating using a wired mode or a wireless mode.

Embodiments of the invention take advantage of the fact that wireless communication tends to be characterized by low bandwidth, high delay, and low reliability relative to wired communication. In an embodiment, one or more of the average RTT, the standard deviation of RTT samples, and the minimal RTT are employed in an inventive manner to distinguish a busy wired client device from a wireless client device. This is important since a busy wired client device may take a long time to respond to a test packet sent by the switch, making the response time of the wired client device look suspiciously similar to the response time of the wireless client devices.

As an example, suppose there exist twenty client devices in a given network, ten of which are known to be wired devices. In this case, the switch would collect RTT samples and compute RTT statistics for the twenty client devices over some monitoring period (e.g., 30 minutes).

Beside the aforementioned average RTT, minimal RTT, and standard deviation for RTT samples, a confidence interval may also be calculated for the group of ten known wired devices. Since the switch does not know whether any of the remaining ten client devices are employing the wireless communication mode to access data on the network (and, in fact, the switch is trying to find out whether wireless communication is employed and which client device is communicating wirelessly), the switch merely collects RTT samples and computing RTT statistics at this point for the remaining 10 devices.

The RTT statistics for each of the ten client devices with unknown communication mode may then be compared against the RTT statistics that have been calculated for the known wired computing devices. If the average RTT, the standard deviation, and/or the minimal RTT of a given client device is higher than corresponding values for the reference wired client devices group, that client device may be flagged as a potential unauthorized wireless device (UWD). This is because, as mentioned, wireless communication is typically characterized by relatively low bandwidth, long delays, and a less reliable connection which leads to more frequent disconnection from the network. These characteristics of wireless communication tend to lead to a longer value for the average RTT, a greater value for the standard deviation, and a higher value for the minimal RTT.

With respect to the suspicious client devices, IT staff may investigate further to determine whether a suspicious client device is in fact a UWD or is simply a wireless client device that is authorized to communicate wirelessly. For example, a physical search may be initiated for the UWD or IT staff may inform the user of the suspicious UWD that such user needs to contact IT staff for validation or risk being blocked. If a suspicious client device is found to be a UWD, IT staff may take steps to block access, to initiate countermeasures, and/or to refer the unauthorized user to prosecution.

The features and advantages of the present invention may be better understood with reference to the figures and discussions that follow. FIG. 1 shows, in accordance with an embodiment of the present invention, a network 100 including a switch 104 coupled with a server 102. Switch 104 is coupled to a wired communication medium 122 (e.g., an Ethernet cable) to which a plurality of client devices and other network devices (such as servers, other switches, firewalls, gateways, etc.) may be coupled. Thus, wired communication medium 122 is shown coupled with three client devices 106, 108, and 120 in the present example.

In the example of FIG. 1, client devices 106, 108, and 120 represent wired computers, i.e., coupled to medium 122 via a non-wireless connection, which may represent a conductive medium or an optical medium, for example. There is also shown a wireless access point 110, representing the wireless switch through which wireless client devices 112 and wireless client devices 114 may communicate with other devices in network 100.

Suppose, for the purpose of illustrating the current example, that wireless device 112 represents an authorized wireless device and wireless device 114 represents an unauthorized wireless device. In this case, the method implemented in switch 104 obtains RTT samples and computes RTT statistics for all client devices in order to ascertain which client device may be a wireless client device (i.e., a client device employing the wireless mode for communication with the enterprise network).

Over some duration known as the monitoring period (e.g., ten minutes, half an hour, etc.) switch 104 occasionally sends test packets to the client devices 106, 108, 112, 114, and 120 in order to obtain RTT data. The RTT data obtained by sending the packets to client devices and receiving responses therefor are then employed to calculate statistical measures such as the average RTT, the standard deviation for RTT samples, and the minimal RTT.

Suppose it is known beforehand that client devices 106 and 108 are wired client devices. In this case, these two client devices (106 and 108) serve as the reference group. As will be discussed later herein, by examining the average RTT, the standard deviation for RTT samples, and the minimal RTT, it is possible to make inferences pertaining a particular device even in the absence of a reference group. However, the use of a reference group of client devices known to be wired renders the method more accurate.

Further, suppose that it is not know whether any of client devices 108, 112, and 114 represent a wired or a wireless client device. In this case, once the statistics for average RTT, standard deviation, and minimal RTT have been generated for the reference wired client devices group, corresponding statistical measures for each of client devices 108, 112, and 114 may be compared against the statistical measures for the reference wired client devices group.

For example, over the course of 30 minutes, switch 104 may send 100 test packets to client device 108 and receive 100 responses, each of which is associated with a RTT value. The 100 RTT samples received from the interaction with client device 108 are then employed to calculate statistics measures such as the average RTT, the standard deviation, and the minimal RTT for client device 108. The same calculation is also performed for wireless client 114 and wireless client 112 to obtain the statistical measures for each of these client devices.

The statistical values calculated for client device 108 is then compared against corresponding statistical values calculated for the reference wired client devices group, which are client devices 106 and 120 in the present example.

If the average RTT and/or the minimal RTT for client device 108 are lower than corresponding statistical values for the reference wired client devices group, client device 108 is marked as suspicious and further investigation may be made to determine whether client device 108 is accessing enterprise network 100 wirelessly. In an embodiment, the comparison may be made by first formulating a confidence interval for each statistical measure (e.g., average RTT, standard deviation, minimal RTT) and determining whether the corresponding value associated with client device 108 falls within the confidence interval. The calculations of an average, a standard deviation, and a minimal, as well as the calculation of a confidence interval from a plurality of sample values are known statistical techniques and will not be discussed in details herein.

The inventors herein realize, however, that mere comparison may be quite misleading and may lead to "false positives." Suppose that client device 108 is extremely busy and thus may not be able to immediately respond to the test packet sent by switch 104. In this case, a comparison of the average and minimal RTT values for client device 108 against corresponding values for the reference wired client devices group would suggest that client device 108 is accessing network 100 wirelessly since wireless communication tends to be characterized by low bandwidth and long delay for packet transmission.

In accordance with an embodiment of the present invention, the standard deviation value is computed and is also examined to prevent "false positives." In this case, by comparing the standard deviation for the RTT samples received from client device 108 against the standard deviation value (or confidence interval thereof) for the reference wired client devices group, the method may be able to ascertain whether client device 108 is a busy wired computing device or is in fact a wireless computing device.

This is because, as discussed, wireless communication tends to be characterized by less reliable connectivity and occasional disconnection, requiring the retransmission of certain packets that were dropped per the TCP protocol. Thus, the standard deviation value for the RTT samples will tend to be higher for a wireless client device than the standard deviation value for the referenced wired client devices group. This is because packets exchanged with a busy wired client device will tend to have similar delays, and thus a fairly low standard deviation value. Accordingly, the use of the standard deviation value as a comparative statistical measure reduces the chance that a busy wired client device may be erroneously identified as a possible wireless client device.

With respect to wireless client device 114 and wireless client device 112, both will tend to show higher average RTT and higher minimal RRT values than corresponding values for the reference wired client devices group. Again, by looking at the standard deviation values for the RTT examples for each of wireless client device 114 and wireless client device 112, and comparing those values to the standard deviation value associated with the reference wired client devices group, it is possible to further confirm that these two client devices (112 and 114) are indeed wireless devices due to their higher standard deviation values.

Once both client devices 112 and 114 are ascertained to be wireless client devices, the result may be compared against a list of authorized wireless client devices to ascertain whether one or both of client devices 112 and 114 are not authorized. If unauthorized, remedial steps may be taken, either automatically or by a human IT staffer. The remedial steps may include for example blocking the unauthorized device from communicating via the enterprise's network or from accessing any other devices on the enterprise's network.

The detection and identification of a wireless client device also implies the existence of a wireless access point such as wireless access point 110. If IT staff is not expecting a wireless access point, such information may suggest that a search should be initiated for the rogue wireless access point, and/or the communication to/from the client devices and/or the wireless access point may be blocked.

With reference to the current example, since client device 108 is now ascertained to be a wired client device, client device 108 may be grouped with the group of known wired client devices and may be employed in the calculation of reference statistical values in the future. By updating the group of reference wired client devices with client devices subsequently discovered to be wired client devices, a more accurate statistical measure for the wired client devices in network 100 may be achieved.

For even greater accuracy, the devices may be separated by types so that the comparison may be made within the same device type (e.g., laptop versus laptop, PDA versus PDA). With a more accurate set of reference statistical values, the invention may be able to ascertain with a greater degree of accuracy whether a particular client device is simply a busy wired client device (e.g., characterized by a high average RTT, and/or a high minimal RTT but a low standard deviation) or a client device that communicates wirelessly (e.g., characterized by high average RTT and/or high minimal RTT and also a high standard deviation).

Figure 2:
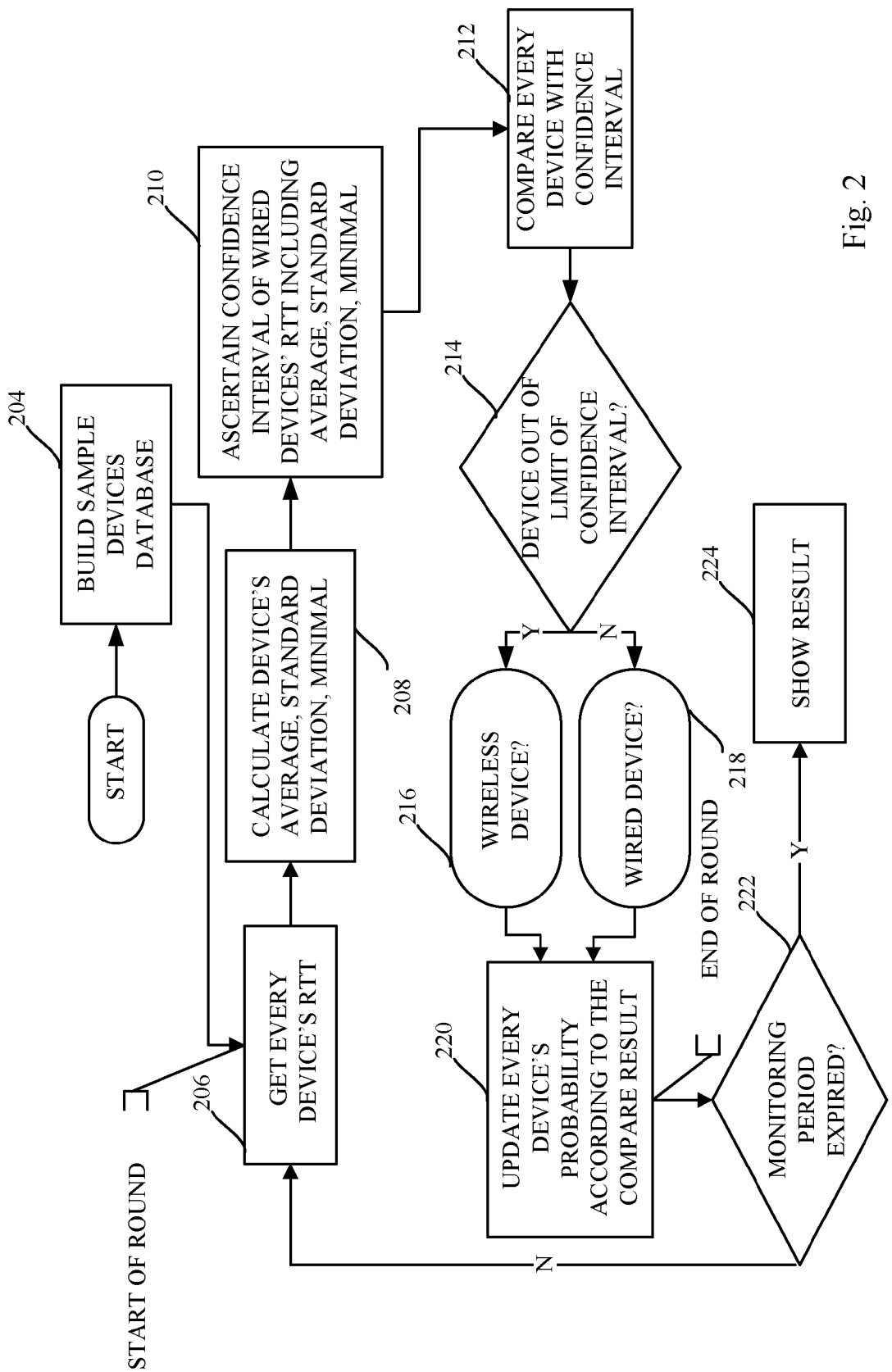
FIG. 2 shows, in accordance with an embodiment of the present invention, the steps for determining the presence and identity of wireless devices on a network.

FIG. 2 shows, in accordance with an embodiment of the present invention, the steps for determining the presence and identity of wireless devices on a network. In step 204, the client device database is built. In this particular example of FIG. 2, all client devices may be included for the purpose of determining the RTT irrespective whether they are known to be wired or wireless client devices at this point.

In step 206, the method begins by obtaining the RTT values for each client device. In step 208, the average RTT, standard deviation, and minimal RTT values are computed. Note that the average RTT, standard deviation, and minimal RTT value would be updated over time as more test packets are sent and more responses are received over the monitoring period.

In step 210, the confidence intervals for the average RTT, the standard deviation, and the minimal RTT for the wired client devices are ascertained. In step 212, the corresponding statistical value for each client device whose communication method is unknown is tested against the confidence interval of the reference wired client devices group.

If the statistical values for a particular client device (e.g., one or more of the average RTT, the standard deviation, and the minimal RTT) exceeds the limit of the confidence interval (the yes branch of step 214), that client device is flagged in step 216 to be a possible wireless device for further investigation. From step 214, investigation may reveal the client device to be one of a wireless client device or a wired client device depending on a combination of the average RTT, minimal RTT, and standard deviation, as discussed earlier.

In step 220, the resolution of the client device to be a wired client device may result in the updating of the reference values and also the updating of the probability that a given client device may be a wireless client device since the reference group membership (and the associated statistics) has been changed.

In step 222, it is ascertained whether the monitoring period has expired. Note that steps 206-222 represent one round of sampling, and multiple rounds may be performed for each monitoring period. If not (the no branch of step 222) control returns to step 206 to obtain additional RTT sample values for the client devices.

On the other hand, if the monitoring period has expired (the yes branch of step 222), the method proceeds to step 224 to display the result to IT staff. After some time, the monitoring may be restarted again and the steps of FIG. 2 may be performed again to detect the presence and identity of wireless client devices and wireless access points.

FIG. 3 shows an example table that is generated by an embodiment of the invention to ascertain whether a particular client device is a wireless client device or a wired client device. In this example, the client device associated with the IP address 10.1.116.5 is ascertained to be a wired client device since its average RTT (287 milliseconds) is lower than the upper limit of the confidence interval for the reference group (534). Further, the standard deviation (7) of this device (10.1.116.5) is lower than the upper limit of the confidence interval for the reference group (39). Additionally, the minimal RTT (281) is also lower than the upper limit of the confidence interval for the reference group (349).

The client computing device associated with the IP address 10.1.116.2 is ascertained to be a wireless client device since its average RTT (2210) is higher than the upper limit of the confidence interval for the reference group (534). Further, the standard deviation (111) of this device (10.1.116.1) is higher than the upper limit of the confidence interval for the reference group (39). Additionally, the minimal RTT (2173) is also higher than the upper limit of the confidence interval for the reference group (349).

The client computing device associated with the IP address 10.1.116.143 is ascertained to be a busy wired client device since its average RTT (890) is higher than the upper limit of the confidence interval for the reference group (534). Further, the minimal RTT (866) is also higher than the upper limit of the confidence interval for the reference group (349). However, the standard deviation (38) of this device (10.1.116.143) is about in the range of the reference group (39). As can be seen, proper use of the standard deviation value prevents a possible erroneous identification of a wired device as wireless in this case.

Figure 4:
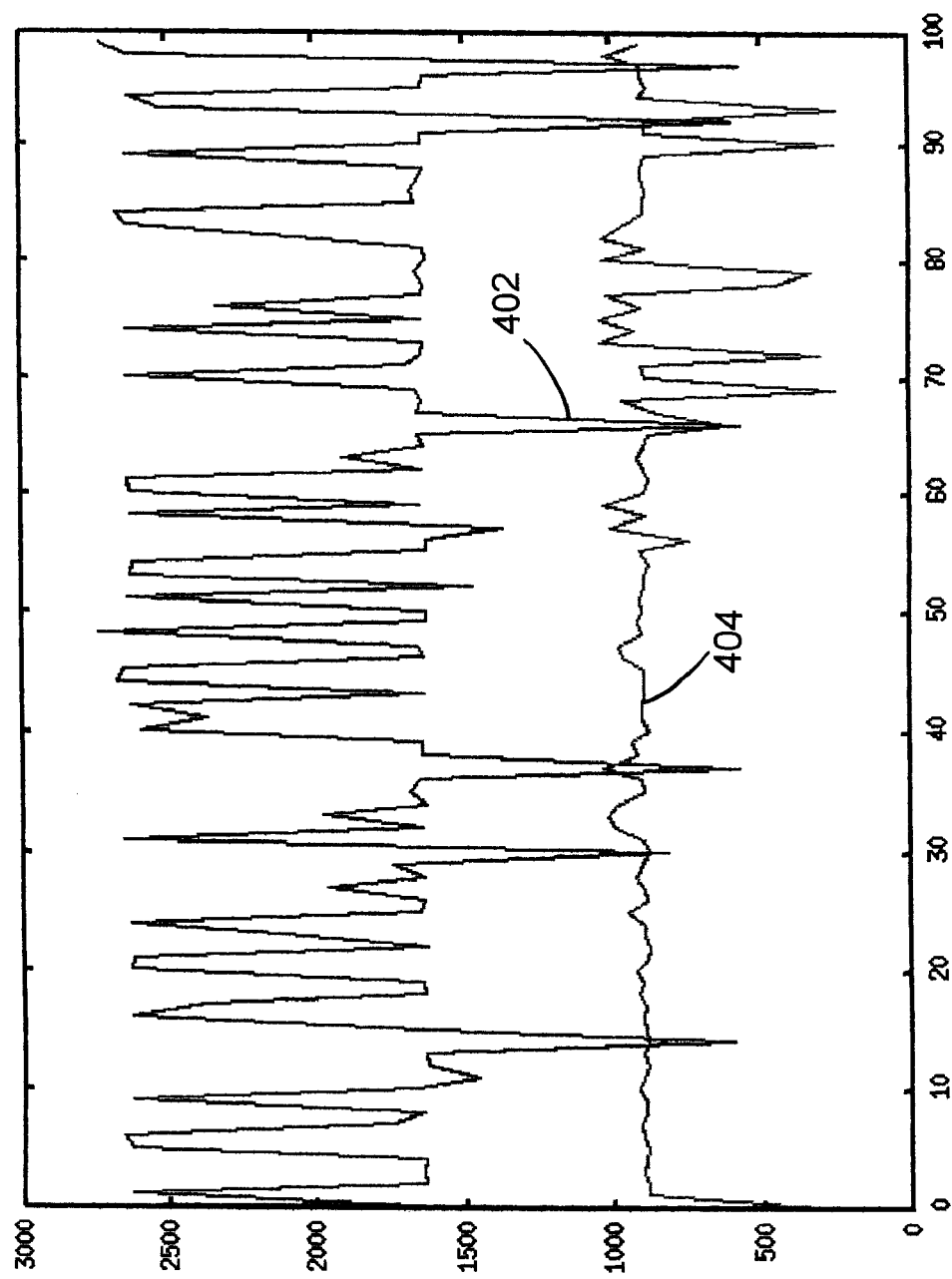
FIG. 4 shows, in an example, of a plot of RTT for a wireless device and a wired device.
Figure 5:
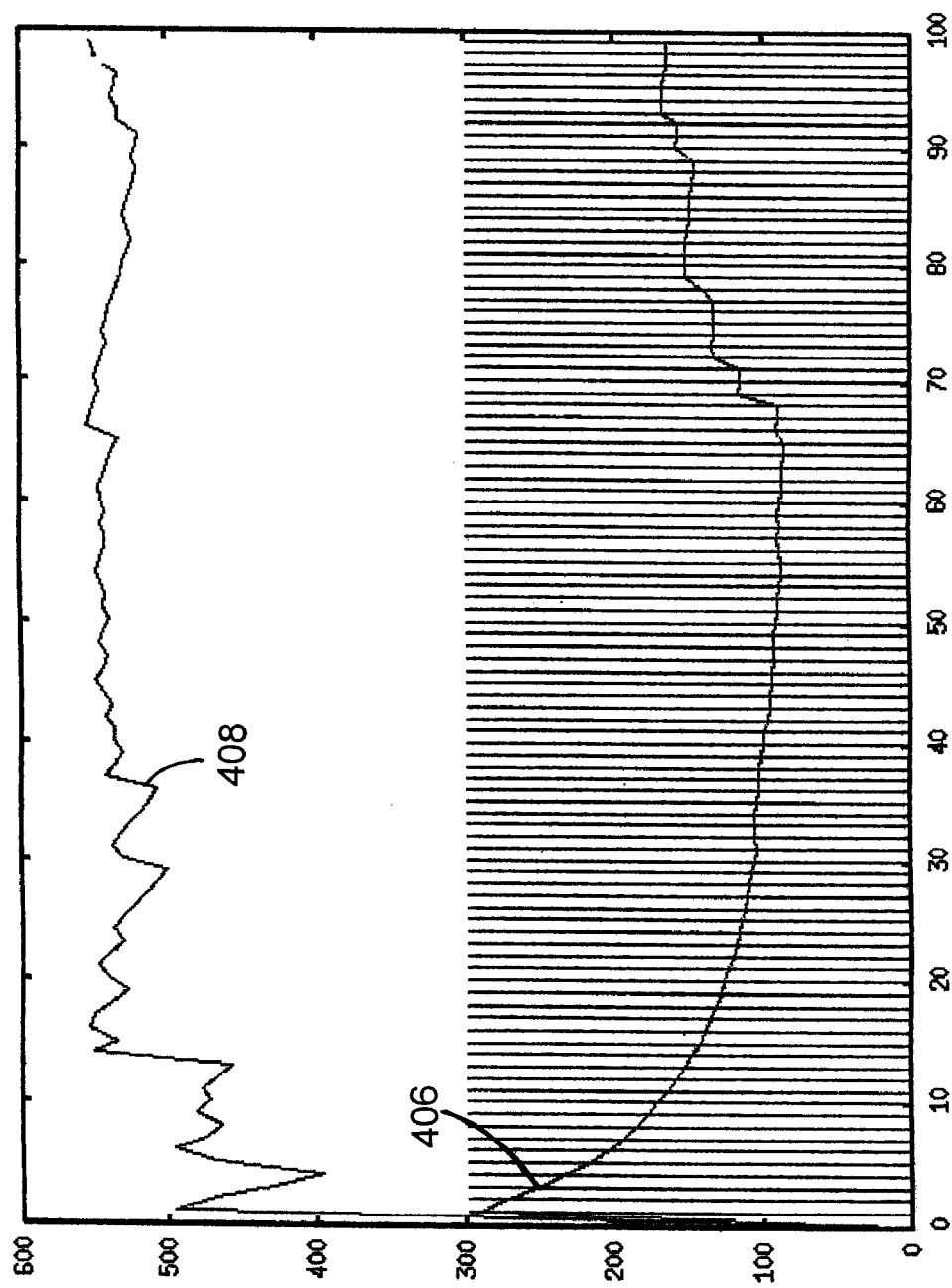
FIG. 5 shows the standard deviation for the wireless device of the example of FIG. 4, as well as the standard deviation for the wired device of the example of FIG. 4 relative to a confidence interval.

FIG. 4 shows, in an example, of a plot of RTT for a wireless device (402) and a wired device (404). As can be seen, the RTT for the wireless device tends to be lower than the RTT for the wired device. FIG. 5 shows the standard deviation (408) for the wireless device of the example of FIG. 4, as well as the standard deviation (406) for the wired device of the example of FIG. 4. The shaded section in FIG. 5 represents the confidence interval. As can be seen, the standard deviation for the wired device (406) tends to stay within the confidence interval while the standard deviation for the wireless device (408) tends to exceed the confidence interval.

As can be appreciated from the foregoing, embodiments of the invention are capable of detecting the presence and existence unauthorized wireless devices irrespective whether the UWDs implement encryption in their communication. Even if IT staff cannot access the management console of an AP, embodiments of the invention can make inferences regarding a client device simply by sending test packets to the client device and tracking the RTT over time. As such, the use of wireless packet sniffers is not require to detect unauthorized wireless communication. The computer-implemented method also does not require any software agent to be installed on the wireless client devices for the purpose of detecting unauthorized wireless communication.

While this invention has been described in terms of several embodiments, there are alterations, permutations, and equivalents, which fall within the scope of this invention. For example, although the switch is discussed to be the device for hosting the application that sends out test packets and calculate RTT based on the response, such application may be implemented in any suitable device on the network. Further, although the average and minimal represent two statistical measures computed, one or both may be replaced by other commonly known statistical measures that can quantify the difference between the RTT associated with a given client device and the RTT associated with the reference group. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A computer-implemented method for ascertaining whether a wireless device exists in a network, comprising:
sending a plurality of test packets over a monitoring period to a first device, said plurality of test packets being sent in a temporally spaced-apart manner;
receiving responses to said plurality of test packets from said first device;
ascertaining a first set of RTT (Round Trip Time) values, each of said first set of RTT values corresponding to one of said plurality of test packets;
computing a first set of statistical values from said first set of RTT values, said first set of statistical values including at least a first standard deviation value for said set of RTT values and one of a first average RTT value and a first minimal RTT value for said first set of RTT values;
designating said first device a potential wireless device if both a first condition and a second condition are found, said first condition is characterized by said at least one of said first average RTT value and said first minimal RTT value exceeds a corresponding one of a reference average RTT value and a reference minimal RTT value, said reference average RTT value representing an average RTT value for known wired devices in said network, said reference minimal RTT value representing a minimal RTT value for said known wired devices in said network, said second condition is characterized by said first standard deviation value exceeding a confidence interval established for a standard deviation value associated with said known wired devices;
after said designating, investigating whether said first device is wireless;
after said investigating, if said first device is determined to be a wired device, updating said reference average RTT value to an updated average RTT value and said reference minimal RTT value to an updated reference minimal RTT value; and
based on said updating, changing a probability that a second device is wireless to an updated probability.

2. The computer-implemented method of claim 1 wherein said first condition is characterized by both said first average RTT value and said first minimal RTT value exceeding said reference average RTT value and said reference minimal RTT value respectively.

3. The computer-implemented method of claim 1 wherein said first condition is characterized by said first average RTT value exceeding said reference average RTT value.

4. The computer-implemented method of claim 1 wherein said first condition is characterized by said first minimal RTT value exceeding said reference minimal RTT value.

5. The computer-implemented method of claim 1 wherein said ascertaining is performed using a network device that also performs said sending said plurality of test packets and said receiving said responses.

6. The computer-implemented method of claim 3 wherein said network device represents a router.

7. The computer-implemented method of claim 1 further comprising designating said first device one of said known wired devices for future calculation purposes if said first device is subsequently confirmed to be a wired device.

8. The computer-implemented method of claim 1 further comprising sending a warning message to said first device if said first device is designated said potential wireless device.

9. The computer-implemented method of claim 1 further comprising blocking access by said first device to said network if said first device is designated said potential wireless device.

10. The computer-implemented method of claim 1 wherein said first device representing one of a laptop computer, a desktop computer, and an internet telephony phone.

11. A computer-implemented method for ascertaining whether a wireless device exists in a network, comprising:
sending a plurality of test packets over a monitoring period to a first device, said plurality of test packets being sent in a temporally spaced-apart manner;
receiving responses to said plurality of test packets from said first device;
ascertaining a first set of RTT (Round Trip Time) values, each of said first set of RTT values corresponding to one of said plurality of test packets;
computing a first set of statistical values from said first set of RTT values, said first set of statistical values including at least a first standard deviation value for said set of RTT values and one of a first average RTT value and a first minimal RTT value for said first set of RTT values;

designating said first device a potential wireless device if a first condition is found, said first condition is characterized by said at least one of said first average RTT value and said first minimal RTT value exceeding a corresponding one of a reference average RTT value and a reference minimal RTT value, said reference average RTT value representing an average RTT value for known wired devices in said network, said reference minimal RTT value representing a minimal RTT value for said known wired devices in said network;

after said designating, investigating whether said first device is wireless;

after said investigating, if said first device is determined to be a wired device, updating said reference average RTT value to an updated average RTT value and said reference minimal RTT value to an updated reference minimal RTT value; and based on said updating, changing a probability that a second device is wireless to an updated probability.

12. The computer-implemented method of claim 11 wherein said first condition is characterized by both said first average RTT value and said first minimal RTT value exceeding said reference average RTT value and said reference minimal RTT value respectively.

13. The computer-implemented method of claim 11 wherein said first condition is characterized by said first average RTT value exceeding said reference average RTT value.

14. The computer-implemented method of claim 11 wherein said first condition is characterized by said first minimal RTT value exceeding said reference minimal RTT value.

15. The computer-implemented method of claim 11 wherein said ascertaining is performed using a network device that also performs said sending said plurality of test packets and said receiving said responses.

16. The computer-implemented method of claim 13 wherein said network device represents a router.

17. The computer-implemented method of claim 11 further comprising designating said first device one of said known wired devices for future calculation purposes if said first device is subsequently confirmed to be a wired device.

18. The computer-implemented method of claim 11 further comprising sending a warning message to said first device if said first device is designated said potential wireless device.

19. The computer-implemented method of claim 11 further comprising blocking access by said first device to said network if said first device is designated said potential wireless device.

20. An article of manufacture comprising a computer readable medium storing computer readable code for ascertaining whether a wireless device exists in a network, comprising:

computer readable code for sending a plurality of test packets over a monitoring period to a first device, said plurality of test packets being sent in a temporally spaced-apart manner;

computer readable code receiving responses to said plurality of test packets from said first device;

computer readable code ascertaining a first set of RTT (Round Trip Time) values, each of said first set of RTT values corresponding to one of said plurality of test packets;

computer readable code computing a first set of statistical values from said first set of RTT values, said first set of statistical values including at least a first standard deviation value for said set of RTT values and one of a first average RTT value and a first minimal RTT value for said first set of RTT values;

computer readable code designating said first device a potential wireless device if both a first condition and a second condition are found, said first condition is characterized by said at least one of said first average RTT value and said first minimal RTT value exceeds a corresponding one of a reference average RTT value and a reference minimal RTT value, said reference average RTT value representing an average RTT value for known wired devices in said network, said reference minimal RTT value representing a minimal RTT value for said known wired devices in said network, said second condition is characterized by said first standard deviation value exceeding a confidence interval established for a standard deviation value associated with said known wired devices;

computer readable code investigating whether said first device is wireless after said designating;

computer readable code updating said reference average RTT value to an updated average RTT value and said reference minimal RTT value to an updated reference minimal RTT value after said investigating if said first device is determined to be a wired device; and computer readable code changing a probability that a second device is wireless to an updated probability based on said updating.

21. The article of manufacture of claim 20 wherein said first condition is characterized by both said first average RTT value and said first minimal RTT value exceeding said reference average RTT value and said reference minimal RTT value respectively.

22. The article of manufacture of claim 20 wherein said computer readable code for ascertaining whether said wireless device exists in said network is implemented at least in part on a router of said network.

23. The article of manufacture of claim 20 further comprising computer readable code for designating said first device one of said known wired devices for future calculation purposes if said first device is subsequently confirmed to be a wired device.

* * * * *